(12) United States Patent
Olesen et al.

(10) Patent No.: US 11,054,535 B2
(45) Date of Patent: Jul. 6, 2021

(54) EFFICIENT, DUAL-PARTICLE DIRECTIONAL DETECTION SYSTEM USING A ROTATING SCATTER MASK

(71) Applicant: US Gov't as represented by Secretary of Air Force, Wright-Patterson AFB, OH (US)

(72) Inventors: Robert Olesen, Fairborn, OH (US); Bryan Egner, Harrisburg, PA (US); Darren Holland, Springfield, OH (US); Valerie Martin, Denver, PA (US); James Bevins, Bellbrook, OH (US); Larry Burggraf, Washington Township, OH (US); Buckley O'Day, Dunn Loring, VA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 19 days.

(21) Appl. No.: 16/812,844

(22) Filed: Mar. 9, 2020

(65) Prior Publication Data

US 2020/0292720 A1   Sep. 17, 2020

Related U.S. Application Data

(60) Provisional application No. 62/816,451, filed on Mar. 11, 2019, provisional application No. 62/816,435, (Continued)

(51) Int. Cl.
*G01T 3/06* (2006.01)
*G01T 1/10* (2006.01)
(Continued)

(52) U.S. Cl.
CPC .............. *G01T 3/06* (2013.01); *G01T 1/15* (2013.01); *G01T 1/20* (2013.01)

(58) Field of Classification Search
CPC .......... G01T 3/06; G01T 7/00; G01T 1/2018; G01T 3/08; A61B 6/4258; G06N 3/04; G06N 3/08
See application file for complete search history.

(56) References Cited

U.S. PATENT DOCUMENTS

| 7,767,972 B2 * | 8/2010 | Juni ...................... G01T 1/1642 250/363.04 |
| 10,901,113 B2 * | 1/2021 | Morton ................ G01N 23/203 |

* cited by examiner

*Primary Examiner* — David P Porta
*Assistant Examiner* — Fani Boosalis
(74) *Attorney, Agent, or Firm* — AFMCLO/JAZ; David E. Franklin

(57) ABSTRACT

A directional radiation detection system and an omnidirectional radiation detector. The omnidirectional radiation detector detects radiation comprising at least one of: (i) gamma rays; and (ii) neutron particles. A radiation scatter mask (RSM) of the radiation detection system includes a rotating sleeve received over the omnidirectional radiation detector and rotating about a longitudinal axis. The RSM further includes: (i) a fin extending longitudinally from one side of the rotating sleeve; and (ii) a wall extending from the rotating sleeve and spaced apart from the fin having an upper end distally positioned on the rotating sleeve spaced apart or next to from a first lateral side of the fin and a lower end proximally positioned on the rotating sleeve and spaced apart from or next to a second lateral side of the fin.

11 Claims, 6 Drawing Sheets

Related U.S. Application Data filed on Mar. 11, 2019, provisional application No. 62/986,892, filed on Mar. 9, 2020.

(51) Int. Cl.
*G01T 1/20* (2006.01)
*G01T 1/15* (2006.01)

EFFICIENT, DUAL-PARTICLE DIRECTIONAL DETECTION SYSTEM USING A ROTATING SCATTER MASK

CROSS-REFERENCE TO RELATED APPLICATIONS

This application claims the benefit of priority under 35 U.S.C. § 119(e) to U.S. Provisional Application Ser. No. 62/816,451 entitled "An Efficient, Dual-particle Directional Detection System using a Rotating Scatter Mask," filed 11 Mar. 2019, the contents of which are incorporated herein by reference in their entirety.

This application claims the benefit of priority under 35 U.S.C. § 119(e) to U.S. Provisional Application Ser. No. 62/816,435 entitled "Rotating Scatter Mask Design Classes for Directional Radiation Detection and Imaging", filed 11 Mar. 2019, the contents of which are incorporated herein by reference in their entirety.

This application claims the benefit of priority under 35 U.S.C. § 119(e) to U.S. Provisional Application Ser. No. 62/986,892 entitled "Rotating Scatter Mask Design Classes for Directional Radiation Detection and Imaging", filed 9 Mar. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of gamma and neutron particle directional detection.

2. Description of the Related Art

Many applications require the search and localization of uncontrolled or unwanted radioactive materials. Some examples include finding orphaned neutron and gamma-ray emitting radioisotopes used in hospital and industrial equipment, illicit tracking of special nuclear material (SNM) from non-state actors and terrorist organizations, monitoring of SNM storage facilities, and the decontamination of nuclear facilities. The development of a portable, modular mixed-radiation directional detection system would be useful for these applications.

Directional radiation identification is not a novel technology, and many systems exist in the open literature and on the commercial market. Three general categories exist for source direction identification: count-based systems, collimator and coded aperture systems, and Compton cameras. In count-based systems, a source's direction is determined by the relative change in the count number as the detector physically changes positions in the search space. This method can be inefficient and increases the user's exposure as they search for the source.

Collimator and coded aperture systems use a pattern-based intervening material, typically designed in a grid with each grid location either consisting of material or void, to create a unique detection pattern. This detection signal can be used to identify the source's direction. However, this method reduces the detector's field-of-view (FOV), and the intervening material can significantly reduce the overall efficiency, which increases the time required to survey surrounding areas. For higher gamma energy levels, the system's weight and portability can also become problematic as demonstrated by the 3,500 lb. 57-NaI detector Large-Area Coded-Aperture Gamma-Ray Imager (see Ziock, et. al., Source-search sensitivity of a large-area, coded-aperture, gamma-ray imager, IEEE Trans. Nucl. Sci. 53 (3) (2006) 1614-1621, which is hereby incorporated by reference in its entirety), or the SuperMISTI (see Hutcheson et al., Maritime detection of radiological/nuclear threats with hybrid imaging system, Homeland Secur. Affairs (2014) 1-5, which is hereby incorporated by reference in its entirety), with a 32,000 lb. 78-NaI detector imaging subsystem.

Compton Cameras can offer up to a $4\pi$ steradian FOV (see C. G. Wahl, et al., Gamma-ray point-source detection in unknown background using 3d-position-sensitive semiconductor detectors, IEEE Trans. Nucl. Sci. 58 (3) (2011) 605-613, which is hereby incorporated by reference in its entirety), and capability to isolate background signatures (see Vetter, et al., Gamma-ray imaging methods, Tech. rep., Lawrence Livermore National Laboratory (LLNL), Livermore, Calif. (2006). and G. W. Phillips, Gamma-ray imaging with Compton cameras, Nucl. Instrum. Methods Phys. Res. B 99 (1) (1995) 674-677, Application of Accelerators in Research and Industry '94, each of which is hereby incorporated by reference in its entirety). However, these systems require multiple detectors to measure coincident Compton events, have a low overall intrinsic efficiency thereby increasing measurement time, and usually ignore full-energy-peak information that can be useful for source characterization.

Greatly simplifying the detection systems of the previous examples, Kowash et. al. (See B. R. Kowash, et. al., A rotating modulation imager for locating mid-range point sources, Nucl. Instrum. Methods Phys. Res. A, 602 (2) (2009) 477-483, which is hereby incorporated by reference in its entirety) introduced the rotating modulation collimator (RMC), developed for both neutron and gamma-ray directional detection, which utilized a single position-insensitive detector placed behind a heavy collimating mask or aperture to generate a unique detector response curve. However, this system was still limited in its FOV and the reliance on a collimating mask, which reduces the overall detection efficiency. The original RMC design suffered from degenerate responses, which was later addressed by H. S. Kim, G. et al. (See H. S. Kim, et al., Design of a Rotational Modulation Collimator Utilizing Asymmetric Masks for the Gamma-Ray/Neutron Dual Imaging Technique, 2016 IEEE Nucl. Science Sym., Medical Imaging Conf. and Room-Temp. Semiconductor Detector Workshop, NSS/MIC/RTSD 2016 2017-January (2017) 4-5, which is hereby incorporated by reference in its entirety).

To solve the field of view problem with a single detector, the Single-Volume Neutron Scatter Camera (SVNSC) obtains directional information through a kinematic reconstruction of two separate neutron elastic scattering (See K. Weinfurther, et. al., Model-based design evaluation of a compact, high-efficiency neutron scatter camera, Nucl. Instrum. Methods Phys. Res. A, 883 (2018) 115-135 and J. Braverman, et. al., Single-Volume Neutron Scatter Camera for High-Efficiency Neutron Imaging and Spectroscopy, arXiv:1802.05261, each of which is hereby incorporated by reference in its entirety). Although this approach obtains a 4π steradian FOV, it is complicated to operate as it requires signal processing electronics with a high time resolution.

Fitzgerald introduced the generally-known rotating scatter mask (RSM) 100 depicted in FIG. 1 as an attempt to overcome many of these current limitations with the ultimate goal of developing a simple, efficient, portable, directional detection system with a large FOV (see FitzGerald, "A rotating scatter mask for inexpensive gamma-ray imaging in orphan source search: Simulation results", IEEE Trans. Nucl. Sci. 62 (1) (2015) 340-348, which is hereby incorporated by reference in its entirety). The Fitzgerald RSM 100 utilizes a rotating mask around a single detector to scatter, not collimate, radiation and determine the direction of a gamma-ray source. By using a single detector, the system complexity and weight are significantly reduced compared to the examples previously mentioned. The use of a rotating mask extends the FOV to nearly-4π and reduces the system efficiency only through mask attenuation, some of which can be recovered through detected mask-scatter events. However, FitzGerald's design generates directional degeneracies that are nearly identical, which can lead to misidentification of the source direction. In addition, the optimal design criteria were unknown, and its application was only considered for gamma radiation. Logan et al. (see Logan et al., Monte Carlo and experimental analysis of a novel directional rotating scatter mask gamma detection system, Nucl. Instrum. Methods Phys. Res. A, 947 (2019) 162698, which is hereby incorporated by reference in its entirety) conducted the first experiments using FitzGerald's design and demonstrated statistical agreement between the simulations and experiments when using gamma sources.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 2:
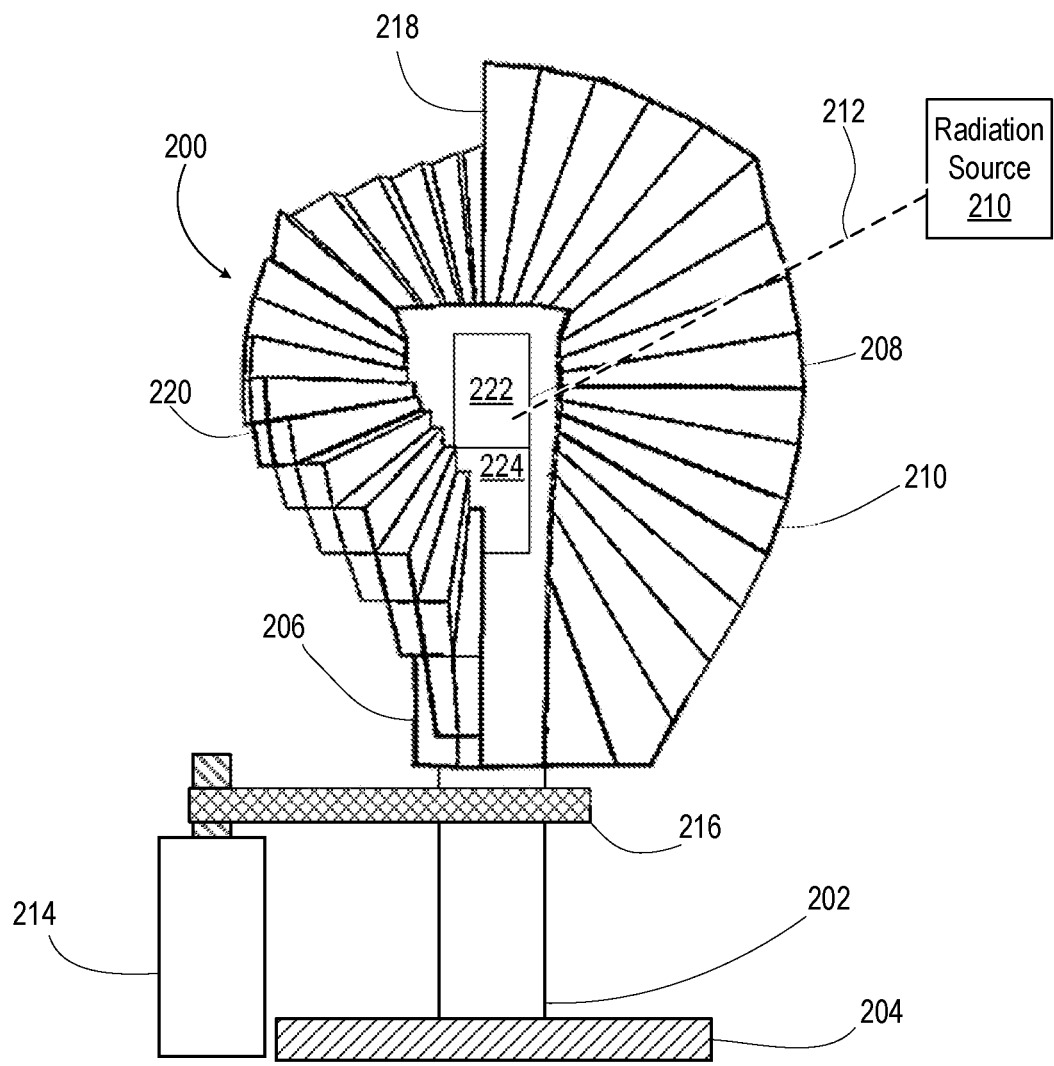
FIG. 2 is a side diagrammatic view of a dual particle detection system having a Spartan RSM, according to one or more embodiments.
Figure 3A:
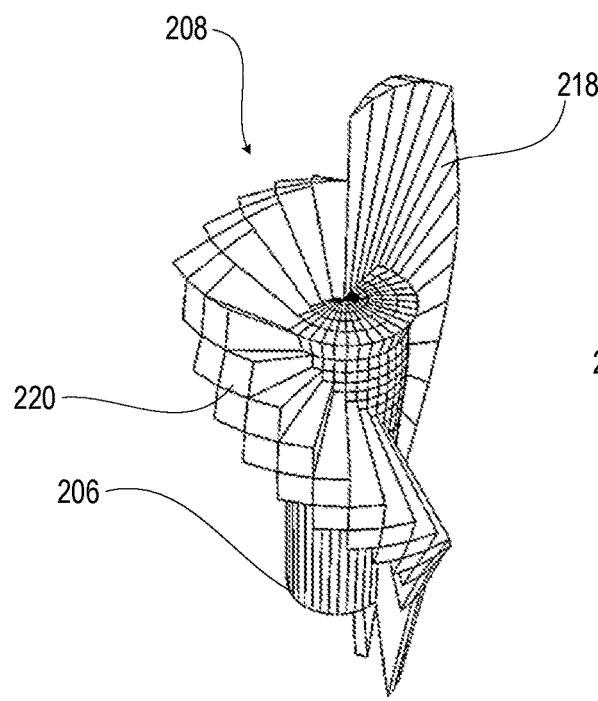
FIG. 3A is a perspective view of the Spartan RSM of FIG. 2, according to one or more embodiments.
Figure 3C:
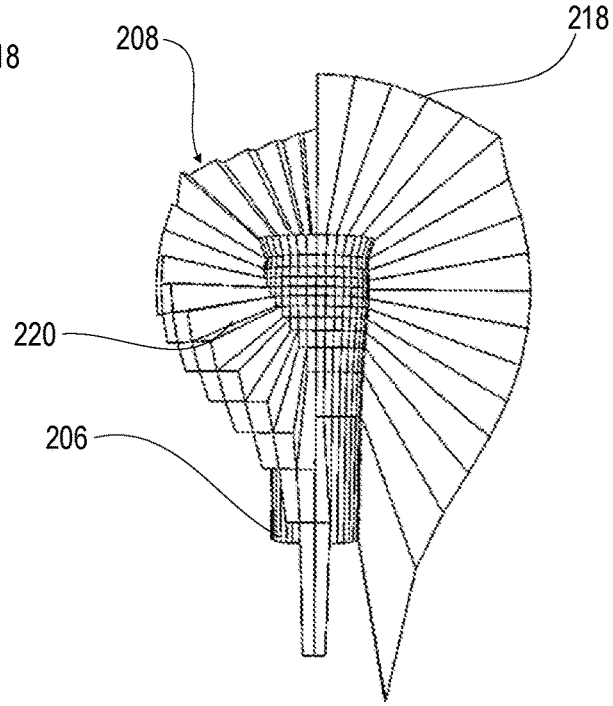
FIG. 3C is a first side view of the Spartan RSM of FIG. 2, according to one or more embodiments.
Figure 3B:
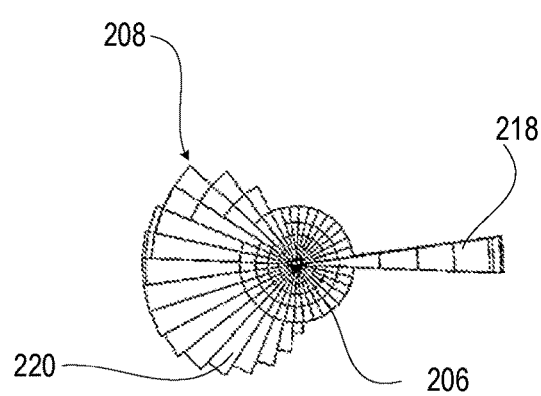
FIG. 3B is a top view of the Spartan RSM of FIG. 2, according to one or more embodiments.
Figure 3D:
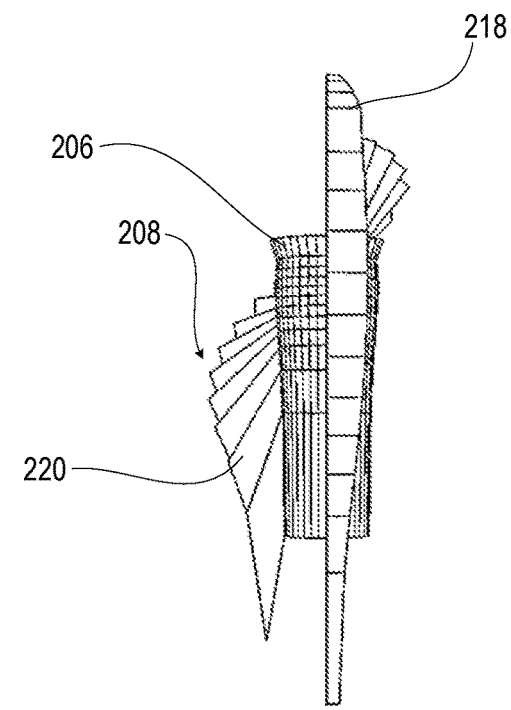
FIG. 3D is a second side view that is orthogonal to the first side view of the Spartan RSM of FIG. 3C, according to one or more embodiments.

A method and apparatus for determining the direction of a gamma, neutron, or dual gamma-neutron radiation source is disclosed. In one or more embodiments, FIG. 2 depicts a dual-particle detection system 200 that includes a stationary inner sleeve 202 mounted to a base 204. The stationary inner sleeve 202 receives a rotating outer sleeve 206 of a "Spartan" RSM 208 that enables accurate directional detection of a radiation source 210 that emits gamma and/or neutron radiation 212. A mechanism rotates the Spartan RSM 208, such as a motor 214 coupled by a belt 216 to the rotating outer sleeve 206. The Spartan RSM 208 includes a physical wall 218 and a fin 220 that impose a geometrically dependent attenuation upon radiation 212 that reaches a radiation detector 222. The radiation detector is omnidirectional. The detected radiation is processed by a digital data acquisition (DAQ) system 224 for directional information. The wall 218 and the fin 220 extend from the rotating outer sleeve 206 forming the outer shell of the Spartan RSM 208.

FIGS. 3A-3D depict respectively a perspective view, a top view, a first side view, and a second side view that is orthogonal to the first side view of the Spartan RSM 208. The wall 218 and a fin 220 of the Spartan RSM 208 provide "geometrical markers". For clarity, consider that Spartan RSM 208 rotates about a longitudinal axis with coordinates of the Spartan RSM 208 and the direction of radiation source 210 defined in a spherical coordinate system. The wall 218 is located at a constant azimuthal (θ) position, while the fin 220 varies in both azimuthal and polar (Φ) directions. Both features have different thickness or widths to allow them to be distinguished from each other. As the radiation 212 of the radiation source 210 passes through the markers (the wall 218 and the fin 220), the radiation 212 is partially scattered and/or attenuated. Depending on the relative thickness of each marker compared to the non-marker thickness, each marker creates a corresponding lower or higher measured response when the marker is between the radiation source 210 and radiation detector 222 as compared to the non-marker response.

Figure 1:
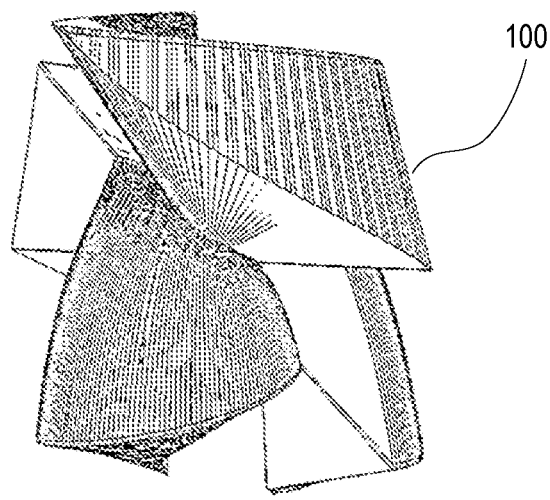
FIG. 1 is a side view of a generally-known Fitzgerald rotating scatter mask (RSM)

With reference to FIGS. 2 and 3A-3D, as the Spartan RSM 208 rotates, physical geometric markers (the wall 218 and the fin 220) produce characteristic markers in the detected response when the radiation source 210 is present. Thus, the dual-particle detector 200 produces a time and position dependent detection signal that can be correlated with the position of the markers (the wall 218 and the fin 220). An associated analysis algorithm combines this signal with the position information to greatly simplify the directional detection and dramatically improve the efficiency of the dual-particle detection system 200. Thus, the dual-particle detection system 200 reduces the time required to identify the source direction. The reduced geometric complexity of the dual-particle detection system 200 as compared to the generally-known FizGerald RSM 100 (FIG. 1) enables the creation of a lighter weight, lower cost, and portable gamma, neutron, or dual gamma-neutron directional radiation identification system.

In one or more embodiments, a two-dimensional design matrix is used to describe the geometry of the dual-particle detector in spherical coordinates to facilitate manufacture. Each matrix entry corresponds to an azimuthal and polar direction and contains a value for the mask thickness. The Spartan RSM 208 may be manufactured out of many materials with an adequate probability for gamma and neutron interactions. However, some materials require thicker geometric features, which increases the size and weight, while reducing its portability.

Figure 4:
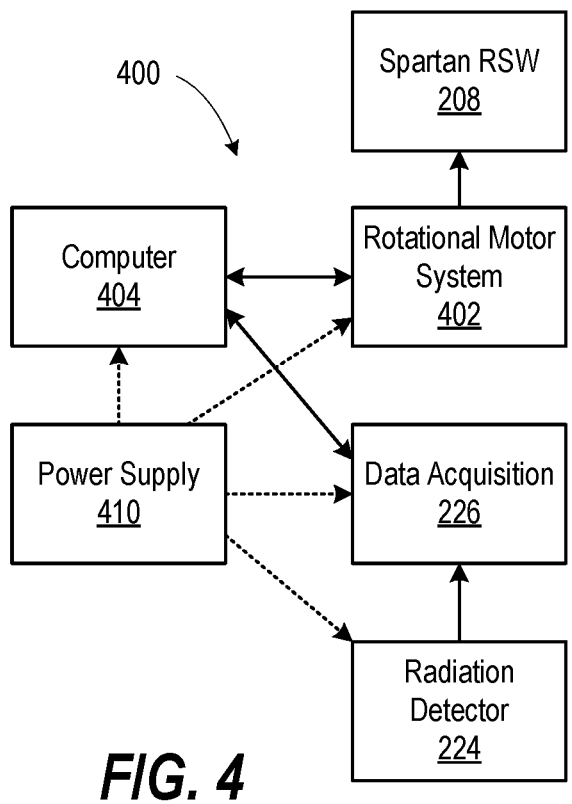
FIG. 4 is a functional block diagram of an example identification system that utilizes the dual-particle detector of FIG. 2, according to one or more embodiments.

FIG. 4 depicts that an example identification system 400 incorporating Spartan RSM 208, a rotational motor system 402, a computer 404, and radiation detection electronics, depicted as the radiation detector 222 and the DAQ system 224. Each of these components has a corresponding power supply 410. For instance, to identify a neutron and gamma source's direction (see Egner et al., Development of a Mixed-Radiation Directional Rotating Scatter Mask Detection System, Theses and Dissertations. (2019) 2357, which is hereby incorporated by reference in its entirety), a pulse-shape discriminating scintillator is mounted to a photodetector to provide the radiation detector 222, which is connected to the DAQ system 224. The radiation detector 222 and DAQ system 224 are secured inside of a fixed detector support tube attached to an assembly box. The present invention is attached to a second support tube (the mask holder) surrounding the first tube, which contains the pulse shape discriminating scintillator and photodetector. The mask and mask holder are supported and rotated by two gears attached to a stepper motor coupled to an encoder ring. The motion of the stepper motor is controlled by a stepper driver configured by a mounted computer 404 (e.g., Raspberry Pi or a personal computer). The DAQ system 224, computer 404, stepper motor, and driver are powered by power supply 410, which can include either or both of rechargeable batteries and direct alternating current power.

Figure 5:
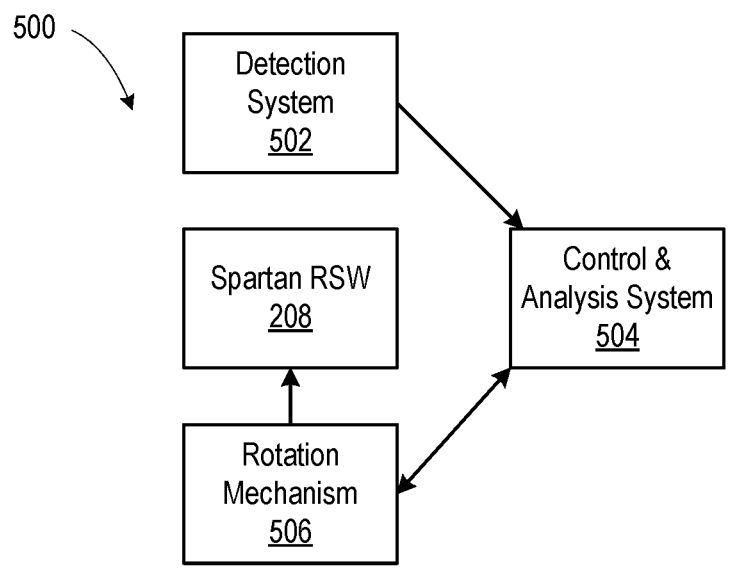
FIG. 5 is a functional block diagram of another example identification system that utilizes the dual-particle detector of FIG. 2, according to one or more embodiments.

FIG. 5 depicts another example identification system 500. A detection system 502 including the detector, associated electronics, and surrounding invention sends information to the identification system 500. At the same time, a control and analysis system 504 works in conjunction with a rotation mechanism 506 to set the correct position of the Spartan RSM 208. The identification system 500 processes the detection information and position of the Spartan RSM 208 to identify the source direction.

Figure 6:
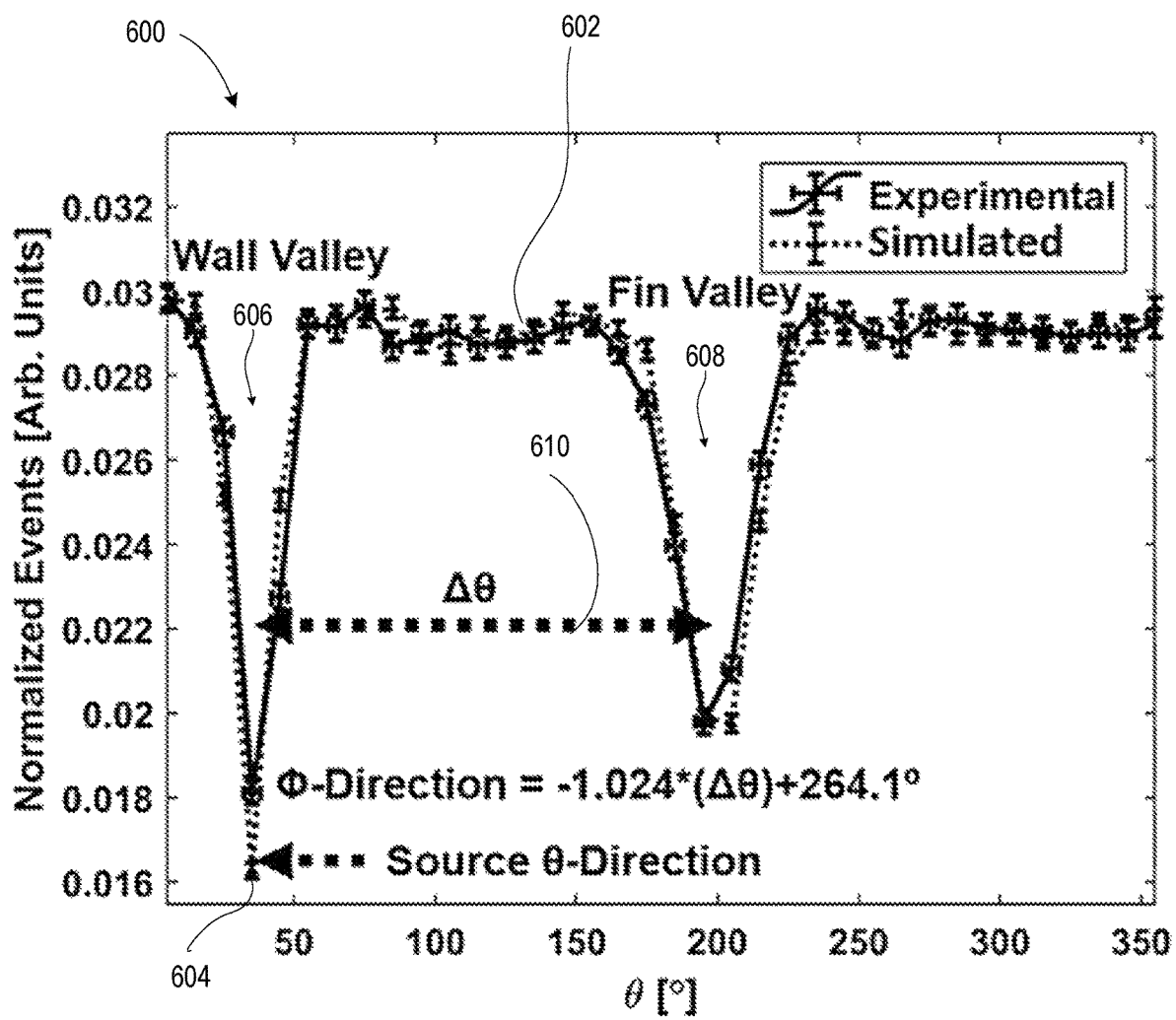
FIG. 6 is a graphical plot of a measured response generated from radiation transport simulations and experimental measurements for one embodiment of the invention.

FIG. 6 depicts a graphical plot 600 of an example detector response curve (DRC) trace 602 generated from radiation transport simulations and experimental measurements for one embodiment of the invention. The source's azimuthal direction 604 is identified based on where the wall valley 606 occurred in the DRC trace 602. The present disclosure was specifically designed so that a fin valley 608 enables the source's polar direction to be identified. This identification can be achieved by relating the physical distance between the centers of geometric wall 218 and fin 220 (FIG. 2) to the DRC rotation distance 610 between the wall 606 and fin valleys 608.

The present disclosure decouples the azimuthal and polar angles. As a result, a linearly independent basis set can be created such that the DRCs are completely orthogonal to each other. This ability contrasts with FitzGerald's design, which contains many similar, dependent DRCs. Thus, the present invention corrects Fitzgerald's RSM deficiencies, resulting in accurate solutions for all directions in the FOV. In addition, Fitzgerald's mask weighs 27 lb., while the portable present prototyped device is only 1.3 lb.

The present invention advances the performance, versatility, and modularity of the RSM system. A prototype according to the present disclosure was shown to improve the directional identification. The present disclosure significantly improves the radiation detection efficiency, reducing the time to identify the source's direction, while enabling a simplified algorithm for identifying the source direction.

The present disclosure is applicable to gamma and neutron sources across a broad range of energies and has the ability to determine the source direction from the mixed-radiation signature. The present disclosure offers a unique combination of a large FOV and high efficiency with portability and dual-particle capabilities.

Figure 7:
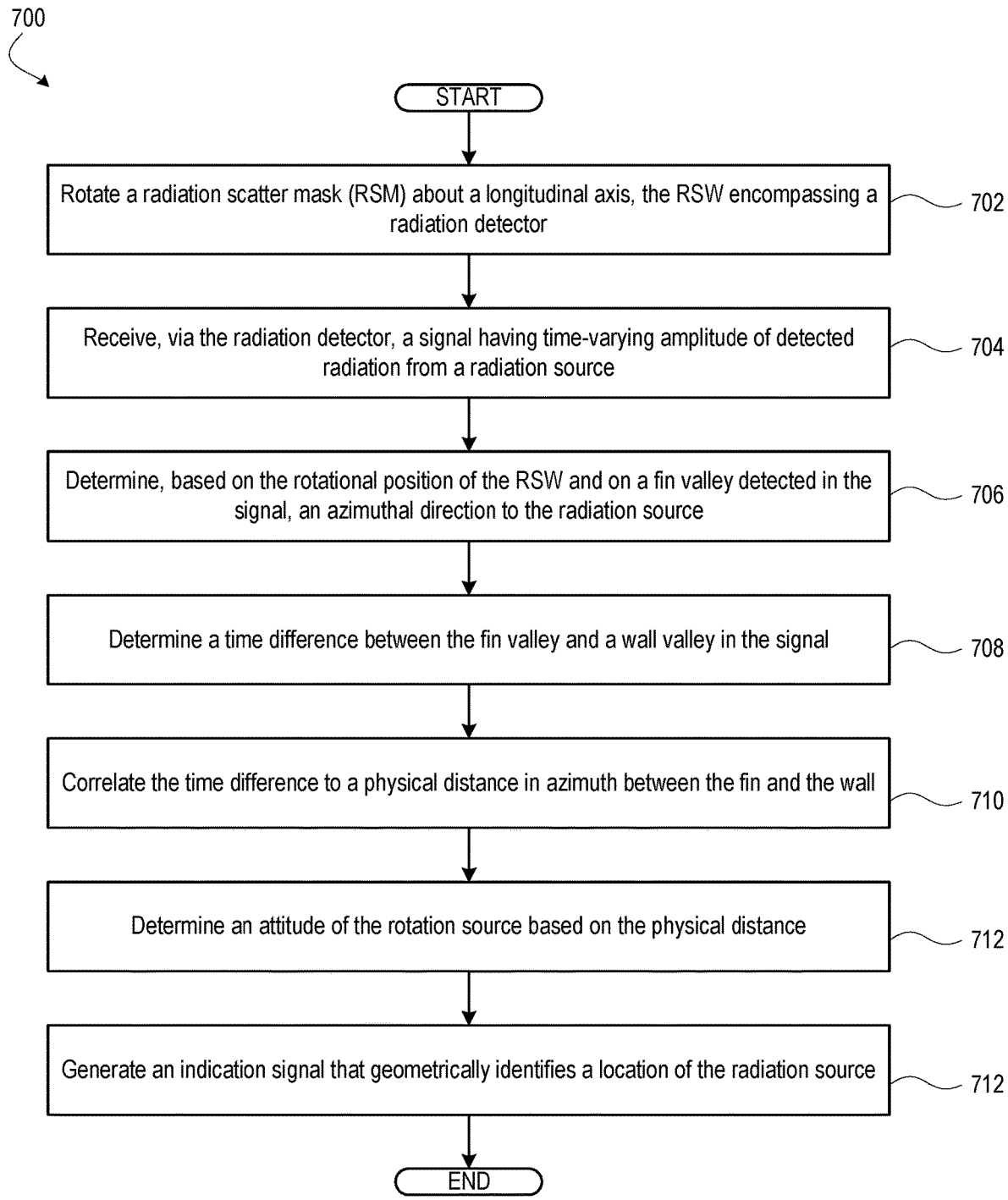
FIG. 7 presents a flow diagram of a method of directionally identifying a radiation source, according to one or more embodiments.

FIG. 7 presents a flow diagram of a method 700 for determining a direction of a radiation source. Method 700 can be performed by the equipment described in FIGS. 1-5. In one or more embodiments, method 700 rotates a radiation scatter mask (RSM) about a longitudinal axis, the RSM encompassing a radiation detector (block 702). The RSM comprises: (i) a fin extending longitudinally from one side of a rotating sleeve; and (ii) a wall extending from the rotating sleeve having an upper end distally positioned on the rotating sleeve spaced apart from or next to a first lateral side of the fin and a lower end proximally positioned on the rotating sleeve and spaced apart from or next to a second lateral side of the fin. Method 700 includes receiving, via the radiation detector, a signal having time-varying amplitude of detected radiation from a radiation source (block 704). Method 700 includes determining, based on the rotational position of the RSM and on a wall valley detected in the signal, an azimuthal direction to the radiation source (block 706). Method 700 includes determining a time difference between the fin valley and a wall valley in the signal (block 708). Method 700 includes correlating the rotational position difference to a physical azimuthal angle between the fin and the wall (block 710). Method 700 includes determining an attitude of the rotation source based on the determined physical azimuthal angle (block 712). Method 700 includes generating an indication signal that geometrically identifies a location of the radiation source (block 714). Then method 700 ends.

In one or more embodiments, method 700 includes detecting the radiation using an omnidirectional radiation detector comprising a pulse-shape discriminating scintillator that is mounted to a photodetector. In one or more embodiments, method 700 includes detecting the radiation comprising gamma rays that pass through the RSM that is formed of a material that scatters and attenuates the gamma rays. In one or more embodiments, method 700 includes detecting the radiation comprising neutron particles that pass through the RSM that is formed of a material that scatters and attenuates neutron particles. In one or more embodiments, method 700 includes distinguishing the fin valley from the wall valley based on a different width or height as a function of time or the RSM's position, wherein the physical fin and the wall of the RSM have different thicknesses or widths relative to azimuth to impart a respective attenuation valley in a detected radiation signal having a different height or width as a function of time or the RSM's position.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A radiation detection system comprising:
   an omnidirectional radiation detector that detects radiation comprising at least one of: (i) gamma rays; and (ii) neutron particles; and
   a radiation scatter mask (RSM) comprising a rotating sleeve received over the omnidirectional radiation detector for rotation about a longitudinal axis, the RSM further comprising: (i) a fin extending longitudinally from one side of the rotating sleeve; and (ii) a wall extending from the rotating sleeve and spaced apart from or next to the fin having an upper end distally positioned on the rotating sleeve spaced apart from or next to a first lateral side of the fin and a lower end proximally positioned on the rotating sleeve and spaced apart from or next to a second lateral side of the fin.

2. The radiation detection system of claim 1, wherein the omnidirectional radiation detector comprises a pulse-shape discriminating scintillator that is mounted to a photodetector.

3. The radiation detection system of claim 1, wherein the RSM is formed of a material that scatters and attenuates gamma rays.

4. The radiation detection system of claim 1, wherein the RSM is formed of a material that scatters and attenuates neutron particles.

5. The radiation detection system of claim 1, wherein the fin and the wall have different thicknesses or widths relative to azimuth to impart a respective attenuation valley in a detected radiation signal having a different height or width as a function of time or the RSM's position.

6. The radiation detection system of claim 1, further comprising:
   a motor that rotates the RSM;
   a rotation sensor the senses a rotational position of the RSM; and
   an identification system communicatively coupled to the rotation sensor and the radiation detector and that comprises a processor that executes program code to enable the radiation detection system to:
      receive, via the radiation detector, a signal having position-varying amplitude of detected radiation from a radiation source;
      determine, based on the rotational position of the RSM, an azimuthal direction to the radiation source based on a fin valley detected in the signal;
      determine a rotational position difference between the fin valley and a wall valley in the signal; and
      correlate the rotational position difference to a physical azimuthal angle between the fin and the wall;
      determine an attitude of the rotation source based on the physical azimuthal angle; and
      generate an indication signal that geometrically identifies a location of the radiation source.

7. A method of determining a direction of a radiation source, the method comprising:
   rotating a RSM about a longitudinal axis, the RSM encompassing a radiation detector and comprising: (i) a fin extending longitudinally from one side of a rotating sleeve; and (ii) a wall extending from the rotating sleeve and spaced apart from or next to the fin having an upper end distally positioned on the rotating sleeve spaced apart from or next to a first lateral side of the fin and a lower end proximally positioned on the rotating sleeve and spaced apart from or next to a second lateral side of the fin;

receiving, via the radiation detector, a signal having position-varying amplitude of detected radiation from a radiation source;

determining, based on the rotational position of the RSM and on a fin valley detected in the signal, an azimuthal direction to the radiation source;

determining a rotational position difference between the fin valley and a wall valley in the signal; and correlating the rotational position difference to a physical azimuthal angle between the fin and the wall;

determining an attitude of the rotation source based on the physical azimuthal angle; and generating an indication signal that geometrically identifies a location of the radiation source.

8. The method of claim 7, further comprising detecting the radiation using an omnidirectional radiation detector comprising a pulse-shape discriminating scintillator that is mounted to a photodetector.

9. The method of claim 7, further comprising detecting the radiation comprising gamma rays that pass through the RSM that is formed of a material that scatters and attenuates the gamma rays.

10. The method of claim 7, further comprising detecting the radiation comprising neutron particles that pass through the RSM that is formed of a material that scatters and attenuates neutron particles.

11. The method of claim 7, further comprising distinguishing the fin valley from the wall valley based on a different height or width as a function of time or the RSM's position, wherein the physical fin and the wall of the RSM have different thicknesses or widths relative to azimuth to impart a respective attenuation valley in a detected radiation signal having a different height or width as a function of time or the RSM's position.

* * * * *